United States Patent [19]
Lundin

[11] Patent Number: 5,972,229
[45] Date of Patent: Oct. 26, 1999

[54] METHOD FOR FILTERING OUT PARTICLES FROM A FLUID

[75] Inventor: Eric Gustaf Lundin, Grimnäs, Sweden

[73] Assignee: Nyfotek AS, Trondheim, Norway

[21] Appl. No.: 09/078,594

[22] Filed: May 14, 1998

Related U.S. Application Data

[63] Continuation-in-part of application No. 08/665,263, Jun. 17, 1996, abandoned.

[51] Int. Cl.[6] .............................. B01D 21/26; B01D 33/00
[52] U.S. Cl. ........................... 210/784; 210/781; 210/788; 210/791; 210/806; 210/297; 210/304; 210/402; 210/407; 209/270; 95/268; 95/270
[58] Field of Search .................................... 210/781, 784, 210/791, 806, 297, 304, 380.1, 407, 497.01, 499, 787, 510.1, 402, 88; 55/408; 95/6, 268, 270; 209/270

[56] References Cited

U.S. PATENT DOCUMENTS

| | | | |
|---|---|---|---|
| 3,363,771 | 1/1968 | Walters | 210/304 |
| 3,443,696 | 5/1969 | Schutte | 210/297 |
| 5,376,268 | 12/1994 | Ikeda | 210/297 |
| 5,882,529 | 3/1999 | Gupta | 210/784 |

*Primary Examiner*—David A. Reifsnyder
*Attorney, Agent, or Firm*—Evenson, McKeown, Edwards & Lenahan, P.L.L.C.

[57] ABSTRACT

A method for filtering out particles from a fluid is disclosed, wherein unfiltered fluid is guided into a filter housing of a filter apparatus and filtered fluid is guided from the filter housing, and wherein a rotary filter element, which has a filter structure and is arranged in the filter housing and is rotatable about an axis thereof, is rotated at a speed which is sufficiently high that all particles passing in a fluid flow into the area of the rotary filter element are affected by its structure and are ejected therefrom, whereas the fluid passes the structure of the rotary filter element substantially freed from the particles and flows off from the filter housing.

13 Claims, 4 Drawing Sheets

OUTLET FOR FLUID

OUTLET FOR PARTICLES

INLET FOR FLUID

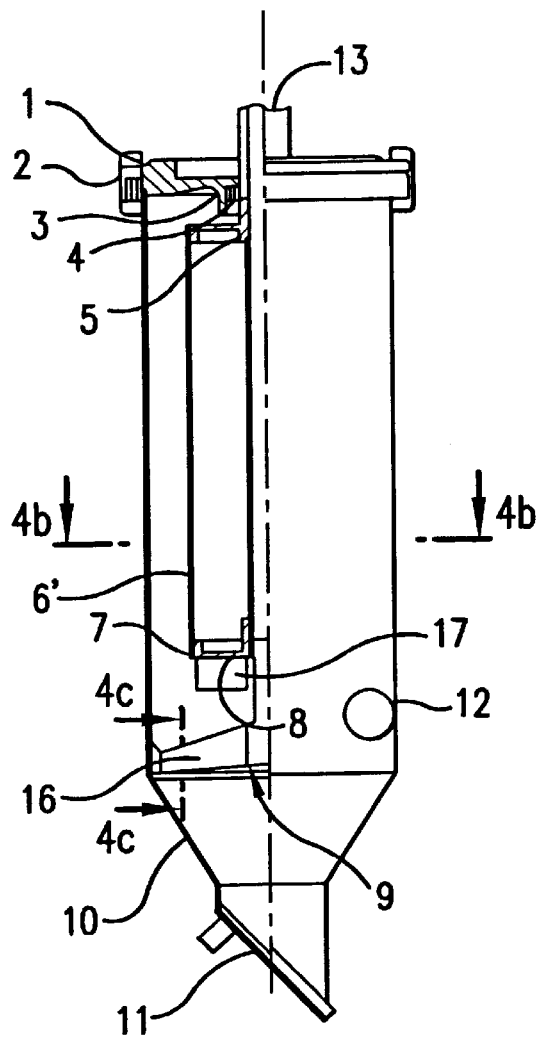
FIG. 4a
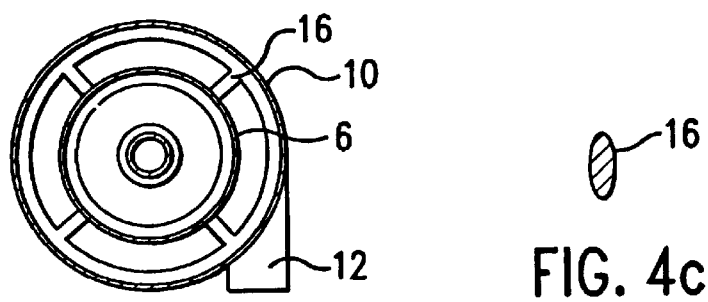
FIG. 4b
FIG. 4c

METHOD FOR FILTERING OUT PARTICLES FROM A FLUID

This is a continuation-in-part of prior U.S. patent application Ser. No. 08/665,263, filed Jun. 17, 1996 now abandoned.

BACKGROUND OF THE INVENTION

The invention relates to a method for filtering out particles from a fluid, wherein unfiltered fluid is guided into a filter housing of a filter apparatus and filtered fluid is guided from the filter housing. A filter element is positioned in rotary manner in the filter housing and may be provided with a substantially cylindrical configuration and with a structure, through which the fluid flows from the outside to the inside.

In general, methods for filtering out particles from a fluid and filter apparatus are known, in which a fluid containing contaminants in the form of particles is forced or sucked through the pores of a filter medium. The particles are left behind on the filter medium, whereas the fluid passes through said filter medium. Such a filter medium provided with pores has a certain flow resistance, which increases over a period of time with an increasing degree of contamination of the filter medium. After a certain time the flow resistance becomes so high that the filter medium must be cleaned. This gives rise to considerable manual effort and costs.

SUMMARY OF THE INVENTION

The object of the invention is to provide a method for filtering out particles from a fluid which is operable without the need for cleaning a filter medium from contamination, which avoids the increase of the flow resistance resulting from contamination of the filter medium, and which is therefore more economical.

According to the invention this object is achieved by a method for filtering out particles from a fluid, wherein unfiltered fluid is guided into a filter housing of a filter apparatus and filtered fluid is guided from the filter housing, and wherein a rotary filter element, which has a filter structure and is arranged in the filter housing and is rotatable about an axis thereof, is rotated at a speed which is sufficiently high that all particles passing in a fluid flow into the area of the rotary filter element are affected by its structure and are ejected therefrom, whereas the fluid passes the structure of the rotary filter element substantially freed from the particles and flows off from the filter housing.

From the flow standpoint the filter apparatus is designed in such a way that within the filter housing the fluid flows along a circular path on the filter element, the fluid being able to pass through the filter element, whereas particles contained in the fluid are ejected away by the filter element rotating at a correspondingly high speed.

A particularly good filtering action is obtained if the fluid flow direction coincides with the rotation direction of the filter element.

An advantage of the filter according to the invention is that the particles to be filtered out cannot jam in the pores of the filter element or be desposited on said filter element and consequently the latter is not contaminated. Therefore there is no need to replace the filter element or clean the same. Instead the particles to be filtered out sink downwards into the filter housing and are deposited there. On its underside the filter housing preferably has a discharge lock through which the deposited particles can be removed.

BRIEF DESCRIPTION OF THE DRAWINGS

The invention is described in greater detail hereinafter relative to non-limitative embodiments and the attached drawings, wherein show.

FIGS. (4a–4c) Another embodiment of the filter according to the invention.

Figure 5:
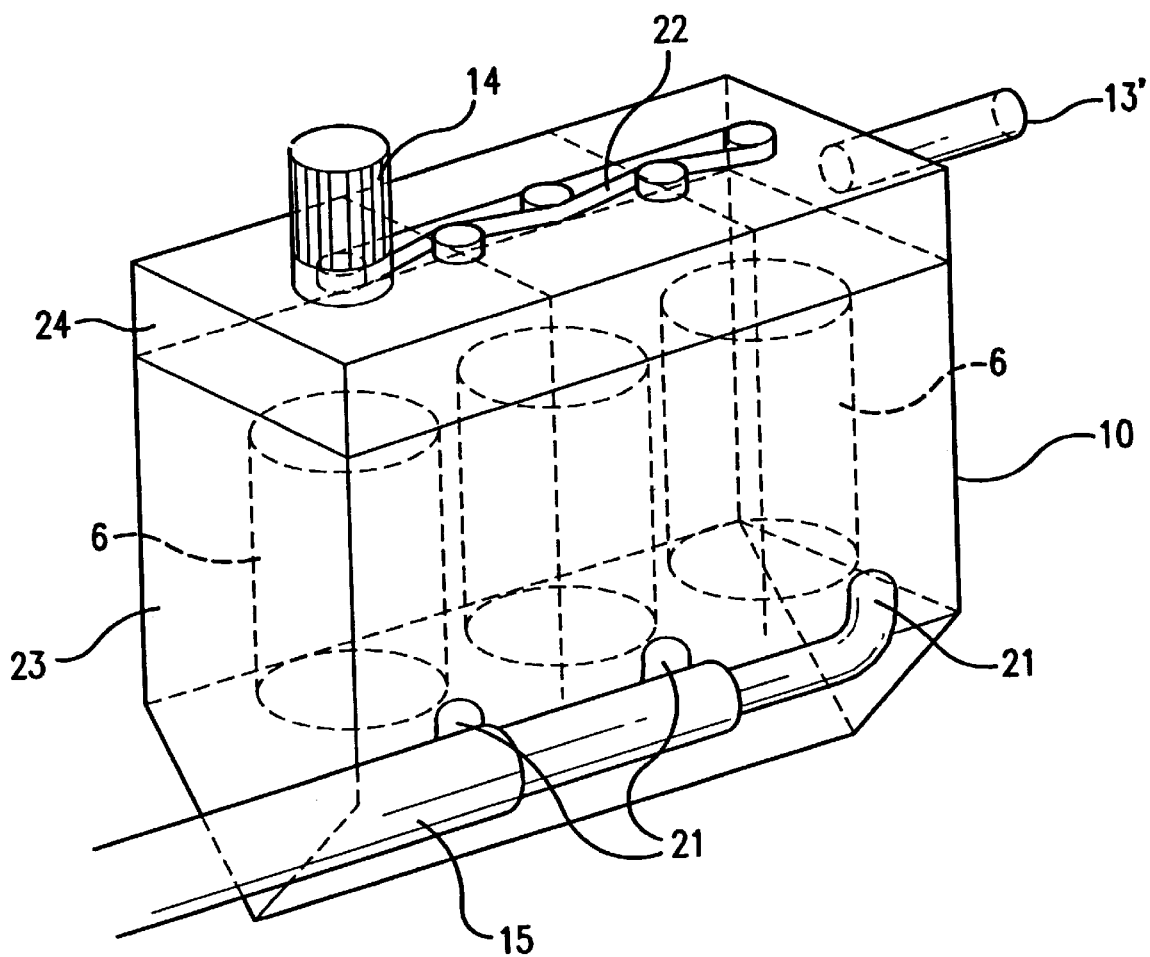

FIG. 5 Another embodiment of the filter according to the invention.

DETAILED DESCRIPTION OF A PREFERRED EMBODIMENT

Figure 1:
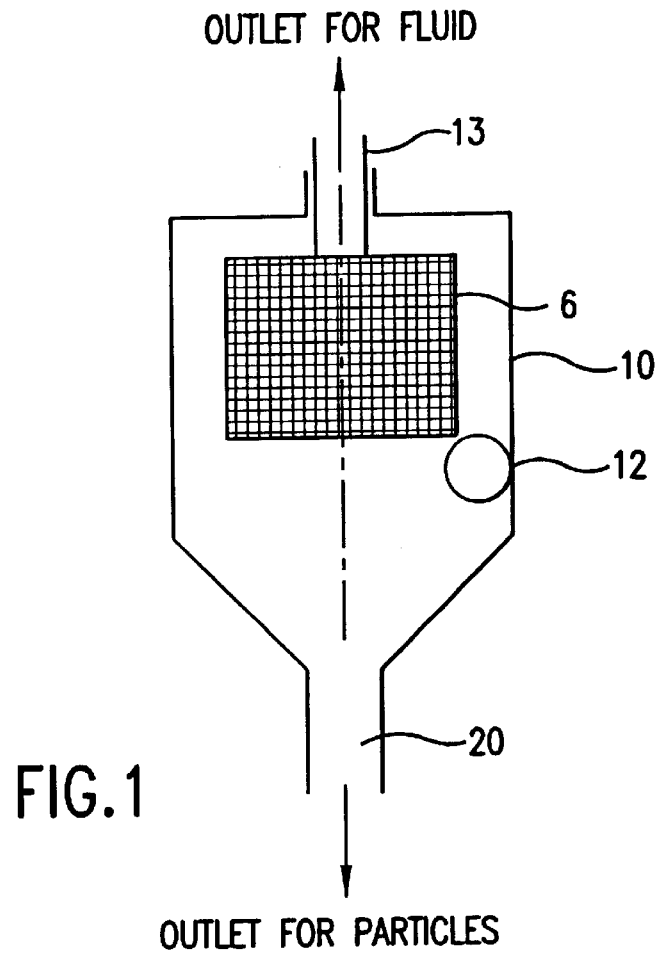
FIG. 1 A diagrammatic embodiment of the filter according to the invention.
Figure 2:
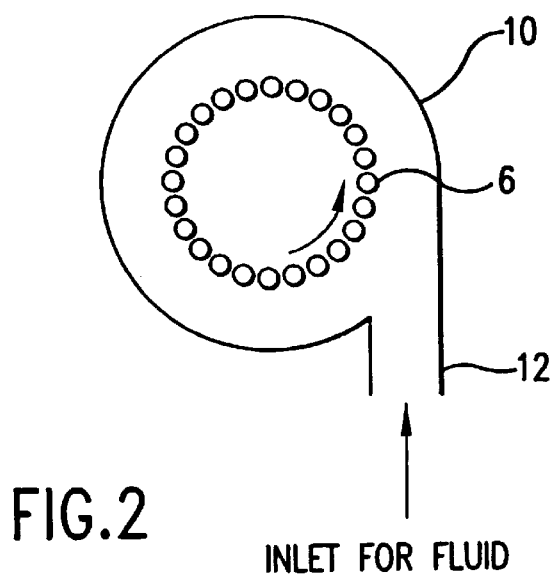
FIG. 2 Diagrammatically a cross-section through a filter according to the invention.

According to FIGS. 1 and 2, the filter has a filter housing 10, in which is mounted in rotary manner a filter element 6. The filter housing 10 has a substantially cylindrical shape, which is funnel-shaped at its lower end. In a lower area of the filter housing is located an inlet 12 for a fluid to be filtered. The filter housing 10 and inlet 12 are so designed that the fluid entering through the inlet flows substantially at right angles to the longitudinal axis and tangentially to the wall of the cylindrical filter housing 10 into the filter. An outlet 13 for the filtered fluid is located on the top of the filter housing 10.

The filter element 6 also has substantially cylindrical outer contours. The filter element 6 is so mounted in the filter housing 10, that a spacing is maintained between the wall of the filter housing 10 and the outer contour of the filter element 6.

In this area the fluid flowing through the inlet 12 tangentially to the wall of the filter housing 10 flows around the filter element 6 until said fluid passes through the filter element and then flows out of the filter again via the outlet 13 which is e.g. coaxial to the rotational axis of the filter element 6. Thus, a flow forms around the filter element 6. The flow rotation direction coincides with the rotation direction of the rotary filter element 6.

The operation of the filter according to the invention will now be described relative to FIG. 3. The fluid circulating in the area round the rotary filter element has on its circular path a much lower circumferential speed than the filter element. This naturally also applies to the particles entrained in the fluid on which acts a centrifugal force, directed away from the filter element, due to the circular movement.

However, when the fluid passes through the filter element in order to leave the filter in cleaned form through the outlet 13, despite the centrifugal force the particles to be filtered off are entrained in the direction of the filter element. They then strike against the filter element rotating at a sufficiently high speed, rebound therefrom and consequently remain on a circular path in the area between the filter element 6 or 6' and the housing 10. This process can be repeated many times until finally the circulating particles, due to the force of gravity, sink downwards, are deposited in the lower part of the filter housing and can pass through a particle outlet 20. As the particles striking against the filter element are ejected therefrom due to the high speed of said filter element before they can penetrate the pores of a filter structure or a filter medium and which due to the centrifugal force acting thereon do not have an adequate energy to remain in the pores of the filter medium, no contamination of the filter element occurs.

Optimum flow conditions in the area between the filter element 6 or 6' and the filter housing 10 occur if there is a minimum of turbulence. Particularly on the wall of the filter housing there is a laminar surface flow layer. The particles preferably sink downwards in said layer. The particles on the one hand enter said layer in that the centrifugal force acts thereon and on the other hand by rebounding from the filter element.

A particularly uniform flow distribution is assisted in that the inlet 12 is located at the bottom and the outlet 13 at the top on the filter housing 10. This leads to an upwardly directed, circular flow in the spacing area with a very uniform distribution of the particle-charged fluid over the entire filter element surface.

Virtually all standard filter materials can be used as the filter medium, provided that they have a structure running in the cylinder longitudinal direction. It is also possible to use smooth filter cloths, as will be described in greater detail hereinafter.

Filter elements 6 suitable for the filter according to the invention can essentially have the following structure. Between a disk-shaped upper part and a disk-shaped lower part is fitted a tubular filter element. In the center of the upper part there is an opening through which can pass out the filtered fluid. The upper part and/or lower part are mounted in rotary manner in the filter housing.

According to FIG. 1 a filter element comprises a perforated sheet or grid. The meshes of the perforated sheet are arranged in the longitudinal and transverse direction to the rotation axis of the filter element. The webs of the perforated sheet running in the cylinder longitudinal direction are essential for the filtering action.

Figure 3:
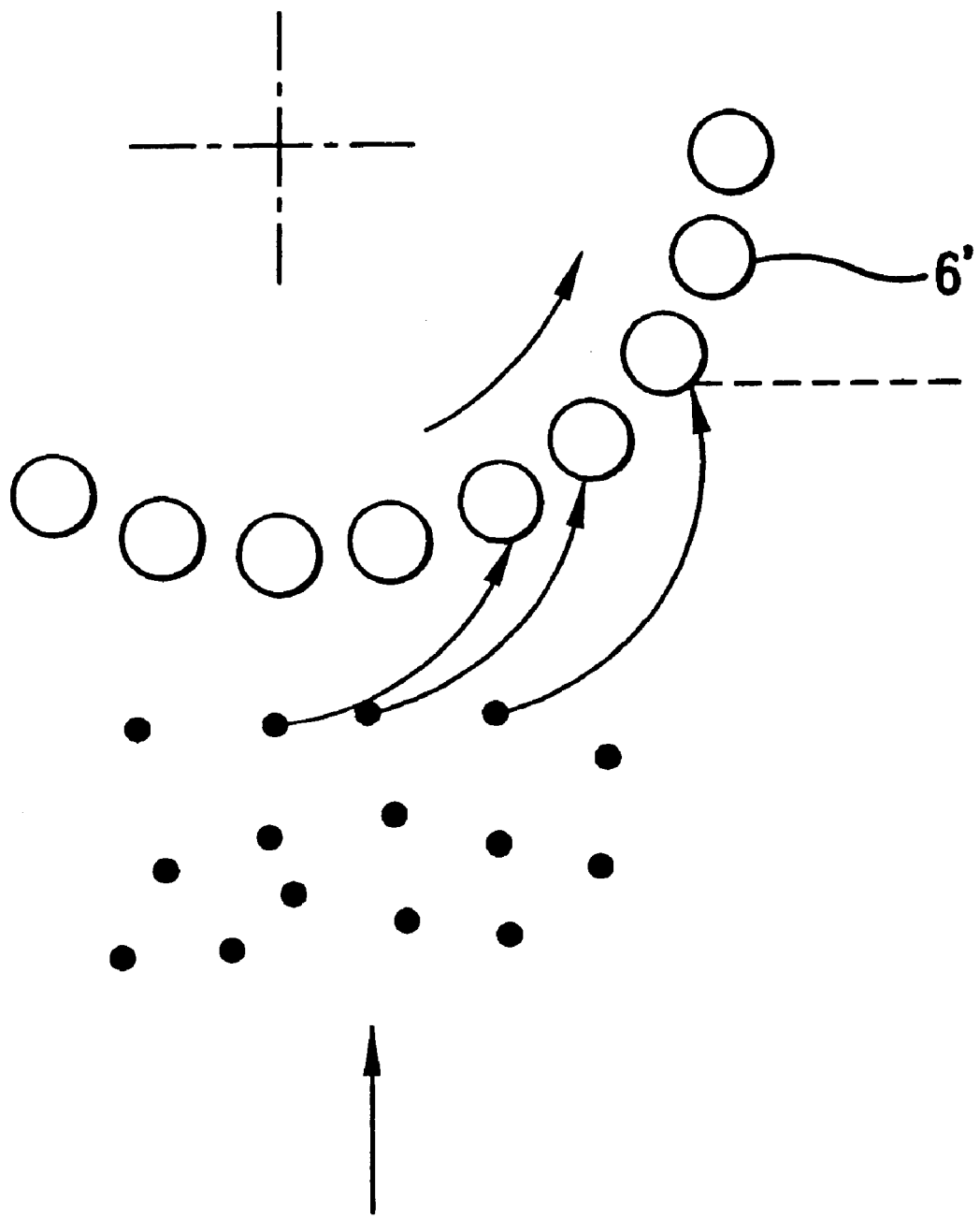
FIG. 3 A diagrammatic representation for illustrating the filtering principle according to the invention.

In another construction such as that shown in FIG. 3 the filter element merely comprises longitudinally directed bars, which are uniformly circumferentially distributed. The spacing between the bars is e.g. 1 mm and the bar thickness is e.g. 4 mm. The filter element e.g. has a diameter of 6 to 8 cm and a height of e.g. 20 cm. The bars or perforated sheet can be covered with a filter cloth, which could then be referred to as a "filter medium".

In a third filter element construction between the upper part and the lower part is fitted a filter cloth. It is particularly appropriate for the filter cloth to be constituted by a fabric, which has thicker threads running in the cylinder longitudinal direction and thinner threads in the circumferential direction. Compared with a perforated sheet or bars in a filter element covered with a filter cloth the same filtering action is obtained with a lower filter element rotation speed. This advantageous effect is due to the denser arrangement of the vertical structural elements essential for the filtering action. Nevertheless the filter cloth must naturally have sufficiently large passages for the fluid to be filtered. Due to the lower rotary speed the loading of the bearings and the intensity of the vibrations initiated by an unbalance which may occur are lower.

In another construction the filter element has a hollow ceramic body, which from its outside to its inside has pores extending towards the outlet. This construction is particularly suitable for filtering liquids.

FIG. 4a shows a cross-section through another embodiment of a filter according to the invention. The filter housing 10 has a design essentially in the form of a cylinder of revolution. At its upper end the filter housing 10 is closed by a cover 1, which is fixed by clips 2 to the filter housing. In the center of the cover is located a ball bearing 3, in which is mounted the upper part 5 of the filter element 6. The bearing shaft of the upper part 5 is hollow and extends through the cover 1 through a corresponding opening therein. The hollow bearing shaft of the upper part 5 forms the outlet 13 through which the filtered fluid can leave the filter.

A rotary seal 4 seals the cover 1 in the vicinity of the ball bearing 3 against the bearing shaft of the filter element 6.

The lower end of the filter housing 10 tapers in funnel-shaped manner and ends in a connecting piece with a discharge lock 11. By opening the discharge lock 11 the dirt which has collected in the lower part of the filter housing can be removed. Above the funnel-shaped taper of the filter housing 10 is located a bearing block 9, which carries a ball bearing 8 located in the center of the filter housing 10. The bearing block 9 has four radially directed struts 16 (cf. the sectional representation of FIG. 4b), which extend radially to the wall of the filter housing 10 and by means thereof the bearing block 9 is connected to the filter housing 10. In the lower area of the filter housing 10, but above the struts 16 of the bearing block 9, there is an inlet 12 for the fluid to be filtered.

A filter medium, e.g. a filter cloth, is positioned between the upper part 5 and the lower part 7. To the underside of the lower part 7 is fitted a plurality of radially directed laminations 17, whose lower end is approximately level with the inlet 12. The upper part 5, the filter medium and the lower part 7 form a rotor, which can be driven from the outside by means of the bearing shaft. By means of the laminations 17 located on the lower part 7 and which act in the manner of a blower or fan, the fluid flowing in through the inlet 12 is given a circular flow in the spacing area between the rotating filter medium and the wall of the filter housing 10.

FIG. 4b shows a cross-section through the filter, by means of which it is possible to see the central position of the filter element 6 within the filter housing 10. It is also possible to see the struts 16 of the bearing block 9 and the arrangement of the inlet 12.

FIG. 4c is a cross-section through a strut of the bearing block 9. The struts 16 have an elongated, elliptical cross-section. The particles sinking in the spacing area between the filter element 6 and the wall of the filter housing 10 consequently drop between the struts 16 through into the funnel-shaped taper of the filter housing 10 without being deposited on said struts 16.

FIG. 5 diagrammatically shows a construction of a filter according to the invention, in which three filter elements 6 are juxtaposed within a common filter housing 10.

A distributing pipe 15 is positioned at the bottom and laterally on the filter housing 10 and it distributes the fluid to be filtered over three inlets 21 associated with the three filter elements 6. On the top of the filter housing 10 there is a common outlet 13'. In addition, at the top on the filter housing 10 is provided a drive machine 14, which by means of a drive belt 22 or other suitable drive means can rotate the three filter elements 6. The filter housing is subdivided into two chambers 23 and 24, one chamber 23 containing the rotating filter element 6. The outlet of the three filter elements issue into the second chamber 24 with the common outlet 13'.

I claim:

1. A method for filtering out particles from a fluid, wherein unfiltered fluid is guided into a filter housing of a filter apparatus and filtered fluid is guided from the filter housing, and wherein a rotary filter element, which has a filter structure and is arranged in the filter housing and is rotatable about an axis thereof, is rotated at a speed which is sufficiently high that all particles passing in a fluid flow into the area of the rotary, filter element are affected by its structure and are ejected therefrom, whereas the fluid passes the structure of the rotary filter element substantially freed from the particles and flows off from the filter housing.

2. A method according to claim 1, wherein the fluid flow is directed from a radial spacing between the filter housing and the filter element through the structure of the filter element to the inside of the filter element.

3. A method according to claim 1, wherein the particles are ejected outwards from the rotating filter element.

4. A method according to claim 1, wherein the fluid flow is guided substantially tangentially to the filter element.

5. A method according to claim 1, wherein the rotary filter element is substantially cylindrical and the fluid flow in a radial spacing between the filter housing and the substantially cylindrical filter element is directed in a circumferential direction which corresponds to the rotary direction of the filter element.

6. A method according to claim 1, wherein the particles which rebound from the rotating filter element move to a particle outlet.

7. A method according to claim 6, wherein the particles are discharged continuously through the particle outlet.

8. A method according to claim 1, wherein the fluid flow is guided through the structure of the filter element which is formed by bars extending substantially parallel to the rotational axis.

9. A method according to claim 8, wherein the fluid flow is guided through the bars which are disposed in an essentially uniform circumferential arrangement with a spacing between the bars of about 1 mm and a bar thickness of about 4 mm.

10. A method according to claim 8, wherein the bars are covered by a filter cloth.

11. A method according to claim 1, wherein the structure of the filter element is formed by a grid or perforated sheet.

12. A method according to claim 1, wherein the structure of the filter element is formed of porous ceramics.

13. A method according to claim 1, wherein the fluid is a gaseous fluid.

* * * * *